United States Patent [19]

Missfeldt

[11] Patent Number: 5,472,839
[45] Date of Patent: Dec. 5, 1995

[54] SPECTRALLY SENSITIZED PHOTOGRAPHIC RECORDING MATERIAL

[75] Inventor: Michael Missfeldt, Bergisch Gladbach, Germany

[73] Assignee: Agfa-Gevaert AG, Leverkusen, Germany

[21] Appl. No.: 263,829

[22] Filed: Jun. 22, 1994

[30] Foreign Application Priority Data

Jul. 5, 1993 [DE] Germany .................. 43 22 302.8

[51] Int. Cl.⁶ .................... G03C 1/18; G03C 1/29
[52] U.S. Cl. .................... 430/574; 430/585; 430/588; 430/589
[58] Field of Search .................... 430/585, 588, 430/589, 572, 574

[56] References Cited

U.S. PATENT DOCUMENTS 3,955,996  5/1976  Hinata et al. .................... 430/588
5,330,887  7/1994  Hasebe et al. .................... 430/588

FOREIGN PATENT DOCUMENTS 2148426  9/1970  Germany .................... 430/588

*Primary Examiner*—Lee C. Wright
*Attorney, Agent, or Firm*—Connolly & Hutz

[57] ABSTRACT

A photographic recording material having a photosensitive silver halide emulsion layer which is spectrally sensitized with a sensitizing dye of one of the formulae I and II

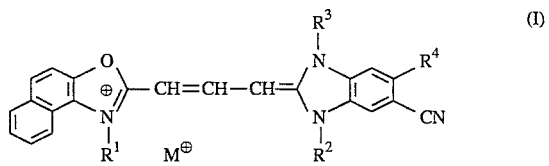

(I)

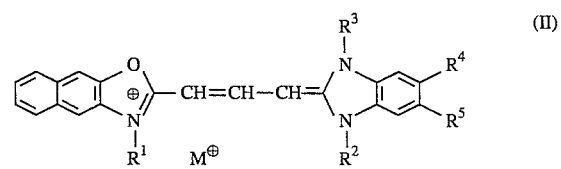

(II)

in which
  $R^1$, $R^2$ denote sulfoalkyl;
  $R^3$ denotes alkyl;
  $R^4$ denotes H, F, Cl, —CN, alkoxycarbonyl, carbamoyl;
  $R^5$ denotes Cl, —CN;
  $M^\oplus$ denotes a counter ion (cation) which is optionally necessary to balance the charge exhibits a high degree of sensitivity which is stable under warm, humid conditions.

2 Claims, No Drawings

SPECTRALLY SENSITIZED PHOTOGRAPHIC RECORDING MATERIAL

The invention relates to a photographic recording material having at least one photosensitive silver halide emulsion layer which is sensitized for the green region of the spectrum with a novel carbocyanine dye containing a naphthoxazole nucleus and a benzimidazole nucleus.

Cyanine dyes having fused azoles as donor and/or acceptor groups have proved to be good spectral sensitizers for recording materials containing photosensitive silver halide.

Trimethincyanines containing benzoxazole, naphthoxazole and benzimidazole are deserving of special mention in this context as regards the green region of the spectrum.

Although benzoxazole trimethins are sensitizers of some photographic merit, they are not always equal to the sensitivity requirements.

Naphthoxazole trimethins and benzimidazole trimethins frequently afford greater sensitivity, yet are not advantageous in terms of colour reproduction because of their long-wave sensitization maxima.

Asymmetric benzoxazole/benzimidazole trimethins are known cyanines which are mentioned in the literature, while the little which is reported on naphthoxazole/benzimidazole trimethincyanines focuses chiefly on those having a betaine structure.

The results when the bis sulphoalkyl derivatives of the latter cyanine class were subjected to systematic investigation were surprising: although the sensitivities afforded by the two representatives of the latter substance class which were known hitherto (JP 60-108 838 dye III-A, JP 60-128 433 dye III-1), in which the benzimidazole ring is substituted with chlorine in the 5th position and with —$CF_3$ or chlorine in the 6th position, are already good, better sensitivity values are afforded by spectral sensitizers obtained by changing the pattern of substitution in the benzimidazole (see general formula I and Table 1).

The object of the invention is a photosensitive photographic recording material having at least one photosensitive silver halide emulsion layer which is spectrally sensitized with a carbocyanine dye containing a naphthoxazole core and a benzimidazole core, characterised in that the silver halide emulsion layer is spectrally sensitized with at least one sensitizing dye of one of the formulae I and II

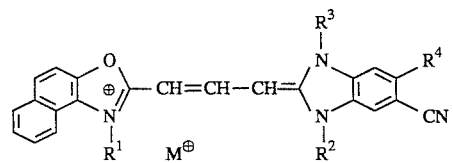

(I)

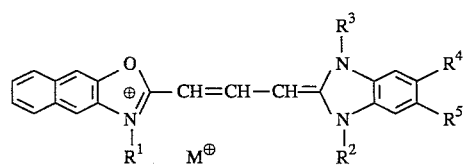

(II)

in which $R^1$, $R^2$ denote sulphoalkyl;

$R^3$ denotes alkyl;

$R^4$ denotes H, F, Cl, —CN, alkoxycarbonyl, carbamoyl;

$R^5$ denotes Cl, —CN;

$M^⊕$ denotes a counter ion (cation) which is optionally necessary to balance the charge.

A sulphoalkyl group represented by $R^1$ or $R^2$ preferably contains 1–4 C atoms and may contain further substituents, for example —OH, halogen; it may also contain a double bond.

Examples are sulphoethyl, sulphopropyl, sulphobutyl, 3-methylsulphobutyl.

An alkyl group represented by $R^3$ preferably contains 1–4 C atoms and may contain further substituents, for example —OH, —$SO_3^⊖$, —$CO_2H$, —$SO_2$—NH—CO—$C_3$.

Preferred examples of $R^3$ are methyl, ethyl.

An example of an alkoxycarbonyl group represented by $R^4$ is —$COOCH_3$ or —$COOC_2H_5$. An example of a carbamoyl group represented by $R^4$ is —$CONR_2$ (having R=—$CH_3$ or —$C_2H_5$).

If the sulphoalkyl groups represented by $R^1$ and $R^2$ are both present in anionic form, $M^⊕$ represents the counter ion which is necessary to balance the charge. $M^⊕$ may denote, for example, a proton, an alkali metal cation or alkaline earth metal cation, $NH_4^⊕$, an organic ammonium ion, an amidinium ion, a guanidinium ion.

Suitable examples of sensitizing dyes of the formula I according to the invention are shown in Table 1. Suitable examples of sensitizing dyes of the formula II according to the invention are shown in Table 2.

In Tables 1 and 2:

Me=methyl

Et=ethyl

SP=—$(CH_2)_3$—$SO_3^⊖$

SEt=—$(CH_2)_2$—$SO_3^⊖$

SBu=—$(CH_2)_4$—$SO_3^⊖$ iSBu=—$(CH_2)_2$—CHMe—$SO_3^⊖$ $S_{max}$=sensitization maximum

TABLE 1

| | $R^1$ | $R^2$ | $R^3$ | $R^4$ | $S_{max}$[nm] |
|---|---|---|---|---|---|
| 1 | Sp | Sp | Et | H | 555 |
| 2 | Sp | SEt | Et | H | 555 |
| 3 | Sp | SBu | Me | H | 552 |
| 4 | Sp | iSBu | Me | H | 553 |
| 5 | Sp | Sp | Me | H | 553 |
| 6 | SBu | Sp | Et | H | 594 |
| 7 | iSBu | Sp | Et | H | 556 |
| 8 | Sp | Sp | Et | Cl | 578 |
| 9 | Sp | iSBu | Et | Cl | 580 |
| 10 | Sp | SEt | Me | Cl | 576 |
| 11 | Sp | iSBu | Me | Cl | 577 |
| 12 | Sp | SBu | Et | Cl | 578 |
| 13 | Sp | Sp | Me | Cl | 576 |
| 14 | iSBu | Sp | Et | Cl | 577 |
| 15 | SBu | Sp | Et | Cl | 578 |

TABLE 2

| | $R^1$ | $R^2$ | $R^3$ | $R^4$ | $R^5$ | $S_{max}$[nm] |
|---|---|---|---|---|---|---|
| 1 | Sp | Sp | Et | Cl | CN | 572 |
| 2 | Sp | Sp | Me | Cl | CN | 569 |
| 3 | Sp | SEt | Me | Cl | CN | 568 |
| 4 | Sp | SEt | Et | Cl | CN | 570 |
| 5 | Sp | iSBu | Me | Cl | CN | 569 |
| 6 | Sp | SBu | Et | Cl | CN | 573 |
| 7 | SBu | Sp | Et | Cl | CN | 572 |
| 8 | iSBu | Sp | Me | Cl | CN | 569 |
| 9 | SBu | SEt | Me | Cl | CN | 568 |
| 10 | Sp | Sp | Et | Cl | Cl | 560 |
| 12 | Sp | SBu | Et | Cl | Cl | 562 |
| 13 | Sp | iSBu | Me | Cl | Cl | 558 |
| 14 | SBu | Sp | Et | Cl | Cl | 562 |

The sensitizing dyes according to the invention are synthesised in accordance with methods which are known per se, as illustrated hereinbelow by the example in which the dye I-1 is synthesised.

Synthesis of the dye I-1

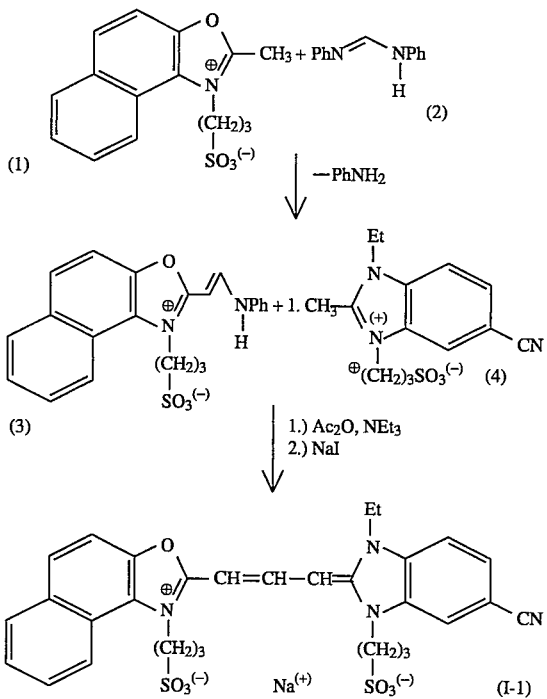

Preparation of the compound (3)

183 g (0.6 tool) of the compound (1) are digested in 300 ml m-cresol under a $N_2$ atmosphere, 153 g (0.79 mol) diphenylformamide (compound (2)) are added and stirring then takes place for 0.45 h at 130° C. The product is allowed to cool to room temperature, 300 ml ethanol are added, filtration under suction and washing with ethanol take place, and the residue is boiled out with 1.5 l ethanol. After filtration under suction and washing of the residue with ethanol, drying takes place. Yield: 215.1 g of the compound (3) (87.8% of theoretical yield).

Preparation of the sensitizing dye I-1

12.24 g (30 mmol) of the compound (3) are digested in 150 ml DMF under a $N_2$ atmosphere, 75 ml acetic anhydride and then 15 ml triethylamine are added, with stirring at room temperature for 10 min. After addition of 9.22 g (30 mmol) of the compound (4), stirring takes place at 72°–73° C. for 2 h.

The dye crystallises out on cooling. After filtration under suction and washing with DMF, the residue is dissolved hot in 1 l methanol and 14.9 g (0.1 tool) NaI dissolved in 50 ml methanol are added. The dye crystallises out on cooling. After filtration under suction and washing with methanol, boiling out takes place with 1 l methanol for 2 h. Filtration under suction with methanol, washing and drying yield 10.35 g of the sensitizing dye I-1 (53.5% of theoretical yield).

The silver halide present as the photosensitive component in the photographic recording material according to the invention may contain as the halide chloride, bromide or iodide, or mixtures thereof. The halide portion of at least one layer may for example comprise from 0 to 15 mol-% iodide, from 0 to 100 mol-% chloride and from 0 to 100 mol-% bromide. In the case of colour negative and colour reversal films, silver bromide-iodide emulsions, and in the case of colour negative and colour reversal paper, silver chloride-bromide emulsions having a high chloride proportion, right up to pure silver chloride emulsions, are normally used. The crystals may be predominantly compact and may, for example, be regular cubes or octahedra, or may exhibit transitional forms. However, lamellar crystals may preferably also be present having a mean aspect ratio of preferably at least 5:1, the diameter of a grain being defined as the diameter of a circle which has the same area as the projected surface area of the grain. The layers may, however, also exhibit tabular silver halide crystals whereof the aspect ratio is substantially greater than 5:1, for example from 12:1 to 30:1.

The silver halide grains may also exhibit a multi-layered granular structure, having in the simplest instance an inner and an outer region of the grain (core/shell), the halide composition and/or other modifications, such as for example, doping of the individual regions of the grain, being different. The mean grain size of the emulsions is preferably between 0.2 µm and 2.0 µm, and the grain size distribution may be both homodisperse and also heterodisperse. Homodisperse grain size distribution means that 95% of the grains deviate by not more than ±30% from the mean grain size.

Two or more types of silver halide emulsions which are prepared separately may be used as a mixture.

The photographic emulsions may be prepared from soluble silver salts and soluble halides by various methods (eg P. Glafkides, Chimie et Physique Photographique [photographic chemistry and physics], Paul Montel, Paris (1967), G. F. Duffin, Photographic Emulsion Chemistry, The Focal Press, London (1966), V. L. Zelikman et al, Making and Coating Photographic Emulsion, The Focal Press, London (1966).

Precipitation of the silver halide preferably takes place in the presence of the binding medium, for example gelatin, and may be performed in an acid, neutral or alkaline pH range, silver halide complexing agents being preferably additionally used. Examples of the latter are ammonia, thioethers, imidazole, ammonium thiocyanate or an excess of halide. The water-soluble silver salts and the halides are brought together, optionally either sequentially using the single-jet process or simultaneously using the double-jet process, or using any combination of the two processes. Dosing at increasing feed rates is preferred, ensuring that the "critical" feed velocity, at which there just takes place no new nucleus formation, is not exceeded. The pAg may vary over a broad range during precipitation, with the so-called pAG-controlled process preferably being used in which a specified pAg value is held constant or a defined pAg profile is followed during precipitation. However, in addition to the preferred precipitation using an excess of halide, a procedure known as "inverse precipitation" is also possible using an excess of silver ion. The silver halide crystals may grow by physical ripening (Ostwald ripening) in the presence of an excess of halide and/or silver halide complexing agents, as well as by precipitation. The growth of the emulsion grains may even take place predominantly by Ostwald ripening, a fine grain emulsion of the type known as a "Lippmann emulsion" preferably being mixed with a more difficultly soluble emulsion and dissolved and precipitated on the latter.

Salts or complexes of metals such as Cd, Zn, Pb, Tl, Bi,

Ir, Rh, Fe may also be present during precipitation and/or physical ripening of the silver halide grains.

When crystal formation is terminated or even at an earlier point, the soluble salts are removed from the emulsion, for example by converting into noodle form and washing, by flocculation and washing, by ultrafiltration or by ion exchangers.

The silver halide emulsion generally undergoes chemical sensitization under defined conditions as to pH, pAg, temperature, concentration of gelatin, silver halide and sensitizer, until optimal sensitivity and fog are achieved. The method is described, for example, by H. Frieser in "Die Grundlagen der Photographischen Prozesse mit Silberhalogeniden" [Basics of photographic processes involving silver halides], pp. 675–734, Akademische Verlagsgesellschaft (1968).

Here the chemical sensitization can take place with addition of compounds of sulphur, selenium, tellurium and/or compounds of the metals of sub-group VIII of the Periodic Table (eg gold, platinum, palladium, iridium); furthermore, thiocyanate compounds, surface-active compounds such as thioethers, heterocyclic nitrogen compounds (eg imidazoles, azaindenes) or also spectral sensitizers (described for example by F. Hamer in "The Cyanine Dyes and Related Compounds", 1964, or Ullmanns Encyclopädie der technischen Chemie, 4th edition, vol. 18, pp. 431 et seq. and Research Disclosure 17643 (December 1978), Chapter III) may be added. By way of substitute or additionally, a reduction sensitization may be performed with addition of reducing agents (tin-II salts, amines, hydrazine derivatives, aminoboranes, silanes, formamidinesulphinic acid), by hydrogen, by low pAg (for example less than 5) and/or high pH (for example greater than 8).

The photographic emulsions may contain compounds to prevent fogging or to stabilize the photographic function during production, storage or photographic processing.

Azaindenes, preferably tetra- and pentaazaindenes, in particular those which are substituted with hydroxyl groups or amino groups, are particularly suitable. Such compounds are described, for example, by Birr, Z. Wiss. Phot. 47 (1952), pp. 2–58. Salts of metals such as mercury or cadmium, aromatic sulphonic or sulphinic acids such as benzenesulphinic acid, or nitrogen-containing heterocycles such as nitrobenzimidazole, nitroindazole, optionally substituted benzthiazolium salts may, furthermore, be utilized as antifog agents. Mercapto group-containing heterocycles, for example mercaptobenzthiazoles, mercaptobenzimidazoles, mercaptotetrazoles, mercaptothiadiazoles, mercaptopyrimidines, are particularly suitable, wherein these mercaptoazoles may also contain a water-solubilizing group, for example a carboxyl group or sulpho group. Research Disclosure 17643 (December 1978), Chapter VI, publishes further suitable compounds.

The stabilizers may be added to the silver halide emulsions before, during or after the ripening of the latter. The compounds may naturally also be added to other photographic layers allocated to a halogen silver layer.

Mixtures of two or more of the compounds named may also be utilized.

At least one photosensitive silver halide emulsion layer of the photographic material according to the invention is spectrally sensitized with one or more of the sensitizing dyes of one of the formulae I and II. The dye may be added to the emulsion to be sensitized after the preparation thereof or alternatively during any phase of preparation, for example during precipitation or physical ripening of the silver halide.

Addition is generally in dissolved form, for example in the form of a solution of the dye in water, methanol, ethanol or mixtures thereof. However, the dye may also be added in finely divided form, for example as a fine dye dispersion.

The sensitization in the green region of the spectrum between 550 and 580 nm which is achieved with the sensitizing dyes according to the invention is not only of a high degree but is also above all stable. The dyes according to the invention are therefore particularly suitable for spectral sensitization of green-sensitive layers of colour photographic materials.

Even higher sensitivities are afforded by admixing a sensitizing dye of the general formula III

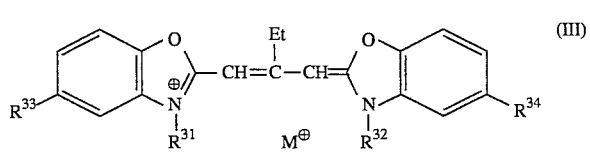

in which $R^{31}$, $R^{32}$ denote radicals such as $R^1$ and $R^2$;

$R^{33}$, $R^{34}$ denote chlorine, phenyl;

$M^{\ominus}$ denotes a counter ion (cation) which is optionally necessary to balance the charge.

Suitable examples of sensitizing dyes of the formula III are (Ph=phenyl):

III-1: $R^{33}=R^{34}=Ph$, $R^{31}=R^{32}=-(CH_2)_2-SO_3^{\ominus}$

III-2: $R^{33}=R^{34}=Ph$, $R^{31}=R^{32}=-(CH_2)_3-SO_3^{\ominus}$

III-3: $R^{33}=R^{34}=Ph$, $R^{31}=R^{32}=-(CH_2)_2-CHMe-SO_3^{\ominus}$ 111-4: $R^{33}=Cl$, $R^{34}=Ph$, $R^{31}=(CH_2)_3-SO_3^{\oplus}, R^{32}=(CH_2)_2-SO_3^{\oplus}$, 111-5: $R^{33}=Cl$, $R^{34}=Ph$, $R^{31}=R^{32}=-(CH_2)_3-SO_3^{\ominus}$ 111-6: $R^{33}=Cl$, $R^{34}=Ph$, $R^{31}=-(CH_2)_3-SO_3^{\oplus}, R^{32}=-(CH_2)_2-CHMe-SO_3^{\ominus}$ Higher sensitivities are also afforded by using two or more sensitizing dyes of one of the general formulae I and II together in combination, it being possible to utilize the different dyes either in mixture with one another or sequentially. Two dyes of the formula I or one dye each of one of the formulae I and II may in particular be combined with one another.

Moreover, an additional and useful effect may be observed: formation of perfect mixing bands the sensitization maxima of which can be displaced within a range of up to 18 nm, depending on the mixing ratio and the sequence of addition to the emulsion. This facility to position the sensitization maximum as desired enables the manufacturer of photographic recording materials to adjust the sensitization maximum for himself so as to achieve good colour reproduction in addition to high sensitivity.

The highest sensitivities of all are achieved by mixing two sensitizing dyes of one of the general formulae I and II with one sensitizing dye of the general formula III.

EXAMPLES

EXAMPLE 1

A photosensitive colour photographic material was prepared in the following manner using the sensitizing dye I-8:

20.6 mg of the sensitizer I-8 ($M^{\ominus}=HN^{\ominus}Et_3$) dissolved in 20.6 ml methanol are added to 100 g of a silver bromide emulsion having a 10% proportion of AgI (205.6 g AgNO$_3$ per emulsion) having a broad grain size distribution and a volume concentration of 1.41 μm after 45 min stirring at 40° C. After stirring for a further 60 min at 40° C., 17.7 mg of the stabiliser ST, dissolved in a mixture of 1.7 g water and 0.053 g 1n NaOH, are added. After addition of 16.2 ml water the temperature is held at 40° C. for a further 10 min, and then with stirring 4 g of the coupler M-1 emulsified in 62 g tricresyl phosphate, 100 ml water, 120 ml 5% aqueous gelatin solution and 81 mg of the cross-linking agent NM, dissolved in a mixture of 1.6 ml water and 0.4 ml methanol, are added. After a further 15 min, the emulsion is cast and then hardened.

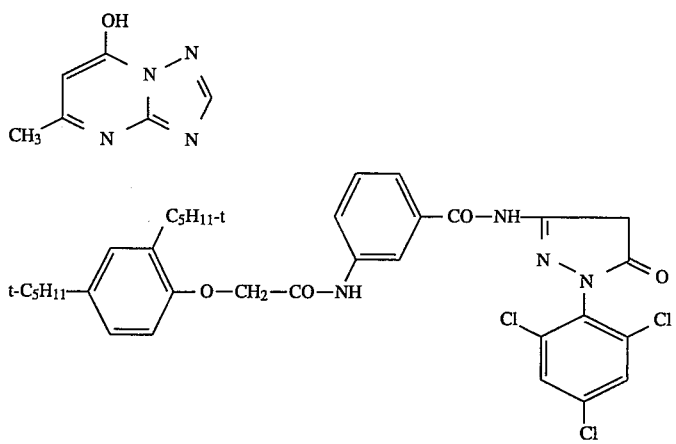

ST

M-1

NM

Further materials were prepared in the same manner but using different sensitizing dyes in place of the sensitizing dye I-8 according to the invention, as can be seen from Table 3. The sensitivity of the materials thus prepared was determined, once in the fresh state (immediately after preparation), once after storage under heated cabinet conditions (7 d, 60° C., 34% relative humidity) and once after storage under tropical cabinet conditions (7 d, 35° C., 90% relative humidity). For this purpose freshly-prepared or correspondingly stored samples of the materials were exposed behind a graduated wedge and underwent colour negative processing, as described in "The Journal of Photographic Science", 1974, pp. 597 and 598. The results are shown in Table 3.

Comparative dye A=dye III-A from JP 60-108 838

Comparative dye B=dye III-1 from JP 60-128 433.

It is apparent from Table 3 that the sensitivities of I-1 and I-8, respectively, when fresh are higher than those of the known sensitizing dyes A and B.

It can furthermore be seen from the Table that loss of sensitivity under storage in warm, humid conditions is less marked in the case of I-1, I-8, II-1 and II-10, that is to say they are more stable than the known sensitizing dyes A and B.

TABLE 3

|  | fresh sample | Sensitivity after storage | |
|---|---|---|---|
|  |  | 7d, 60° C., 34% rel. humidity | 7d, 35° C., 90% rel. humidity |
| I-1 | 41.8 | 40.7 | 39.5 |
| I-8 | 42.5 | 41.6 | 40.7 |
| II-1 | 39.5 | 39.1 | 38.1 |
| II-10 | 39.3 | 38.3 | 37.9 |

TABLE 3-continued

|  | fresh sample | Sensitivity after storage | |
|---|---|---|---|
|  |  | 7d, 60° C., 34% rel. humidity | 7d, 35° C., 90% rel. humidity |
| A | 40.0 | 34.7 | 29.1 |
| B | 40.8 | 40.1 | 37.2 |

EXAMPLE 2

The sensitivities when fresh of correspondingly prepared materials additionally sensitized with a sensitizing dye of the general formula III were determined as described in Example 1. The dye of the formula III was used in the same quantity as the dye of the formula I or II or the comparative dye. The same surface covering was obtained with each dye pair as in Example 1. The values obtained for sensitivity when fresh are shown in Tables 4 and 5. The dyes which are in each case shown in the top row were added first to the emulsion.

TABLE 4

|  | Sensitivity when fresh | | | | |
|---|---|---|---|---|---|
|  | III-3 | III-5 | III-1 | III-6 | III-4 |
| B | 40.1 | 40.3 | 40.0 | 40.2 | 40.5 |
| A | 39.1 | 39.5 | 38.9 | 39.3 | 39.2 |
| II-1 | 41.7 | 41.5 | 40.7 | 41.5 | 41.1 |
| I-1 | 41.6 | 42.0 | 42.0 | 42.2 | 42.1 |
| I-8 | 42.2 | 42.6 | 42.3 | 42.5 | 42.3 |

TABLE 5

|  | Sensitivity when fresh | | | | |
|---|---|---|---|---|---|
|  | B | A | II-1 | I-1 | I-8 |
| III-3 | 39.9 | 39.2 | 41.6 | 41.8 | 42.4 |
| III-5 | 40.2 | 39.9 | 40.9 | 42.7 | 42.7 |
| III-1 | 40.1 | 39.0 | 41.8 | 41.9 | 42.5 |
| III-6 | 40.4 | 39.1 | 41.6 | 42.2 | 42.6 |
| III-4 | 40.5 | 39.4 | 41.8 | 42.3 | 42.5 |

EXAMPLE 3

The values for sensitivity when fresh were determined, as described in Example 1, for correspondingly prepared materials sensitized with a mixture of two sensitizing dyes of one of the formulae I and II, with the dyes being utilized in different mixing ratios. The same surface covering was obtained with each dye pair as in Example 1. The results are shown in Table 6. The dye mentioned first in each case in the top row is the first to be added to the emulsion. The sensitization maxima achieved in each case are also indicated in Table 6. It is apparent that varying the mixing ratio enables the position of the sensitization maximum to be varied over a broad range without substantially impairing sensitivity.

TABLE 6

Sensitivity when fresh and sensitization maximum

| Mixing ratio | I-1/II-1 E | I-1/II-1 $S_{max}$ [nm] | II-1/I-1 E | II-1/I-1 $S_{max}$ [nm] | I-1/I-8 E | I-1/I-8 $S_{max}$ [nm] | I-8/I-1 E | I-8/I-1 $S_{max}$ [nm] |
|---|---|---|---|---|---|---|---|---|
| 1/5 | 42.2 | 575 | 42.6 | 557 | 42.2 | 570 | 42.5 | 560 |
| 1/4 | 42.4 | 575 | 42.7 | 557 | 42.6 | 570 | 42.2 | 560 |
| 1/3 | 42.2 | 575 | 42.6 | 560 | 42.3 | 570 | 42.3 | 562 |
| 1/2 | 42.5 | 570 | 42.8 | 565 | 42.2 | 570 | 42.3 | 567 |
| 1/1 | 42.8 | 565 | 42.9 | 570 | 42.4 | 565 | 42.3 | 570 |

EXAMPLE 4

The values for sensitivity when fresh were determined, as described in Example 1, for correspondingly prepared materials sensitized with a trio of dyes comprising two dyes of one of the formulae I and II and one dye of the formula III. The same surface covering as in Example 1 was obtained with each trio of dyes. Table 7 indicates the sensitivity values obtained for various mixing ratios of the sensitizing dyes used in the trios. The dye sequence indicated in the top row also corresponds to the order in which they were added to the emulsion.

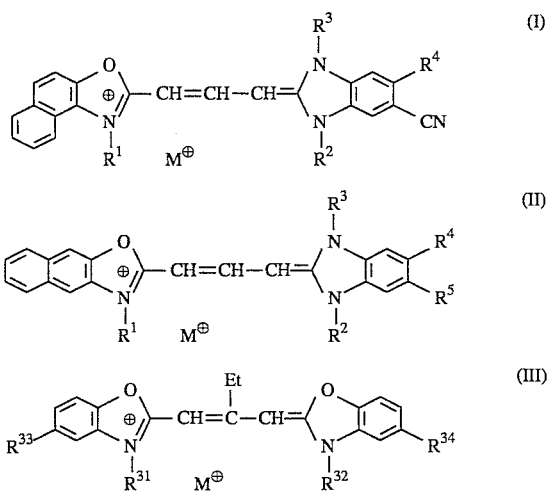

$R^1$ and $R^2$ denotes sulfoalkyl;

$R^3$ denotes alkyl;

$R^4$ denotes H, F, Cl, —CN, alloxycarbonyl or carbamoyl;

$R^5$ denotes —CN;

$M^\oplus$ denotes a counter ion (cation) which is optionally necessary to balance the charge;

$R^{31}$ and $R^{32}$ denotes sulfoalkyl;

$R^{33}$ and $R^{34}$ denotes Cl or phenyl.

2. Photosensitive photographic recording material comprising at least one photosensitive silver halide emulsion layer which is spectrally sensitized with a mixture of at least three sensitizing dyes in which them is at least one sensitizing dye of each of formulae I, II and III

TABLE 7

Sensitivity when fresh

| III-6/I-8/I-1 MIXING RATIO | E | I-8/I-1/III-6 MIXING RATIO | E | III-4/I-8/I-1 MIXING RATIO | E | I-8/I-1/III-4 MIXING RATIO | E | III-4/II-1/I-1 MIXING RATIO | E | II-1/I-1/III-4 MIXING RATIO | E |
|---|---|---|---|---|---|---|---|---|---|---|---|
| 1/1/5 | 43.0 | 1/1/1 | 42.9 | 1/1/5 | 42.4 | 1/1/1 | 43.3 | 1/1/5 | 42.4 | 1/1/1 | 43.3 |
| 1/1/4 | 42.9 | 1/2/1 | 43.0 | 1/1/4 | 42.9 | 1/2/1 | 42.4 | 1/1/4 | 42.9 | 1/2/1 | 42.4 |
| 1/1/3 | 42.8 | 1/3/1 | 42.9 | 1/1/3 | 43.3 | 1/3/1 | 43.5 | 1/1/3 | 43.3 | 1/3/1 | 43.5 |
| 1/1/2 | 42.7 | 1/4/1 | 43.3 | 1/1/2 | 42.8 | 1/4/1 | 42.8 | 1/1/2 | 42.8 | 1/4/1 | 42.8 |
| 1/1/1 | 42.6 | 1/5/1 | 42.7 | 1/1/1 | 42.7 | 11511 | 42.5 | 1/1/1 | 42.7 | 1/5/1 | 42.5 |

I claim:

1. Photosensitive photographic recording material comprising at least one photosensitive silver halide emulsion layer which is spectrally sensitized with a mixture of at least three sensitizing dyes of which at least two are independently selected from the group consisting of sensitizing dyes of the formulae I and II and at least one sensitizing dye is of the formula III

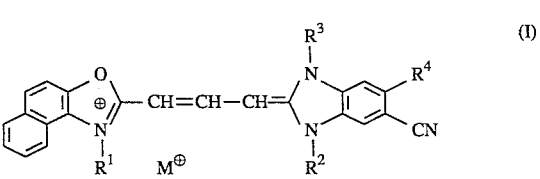

-continued
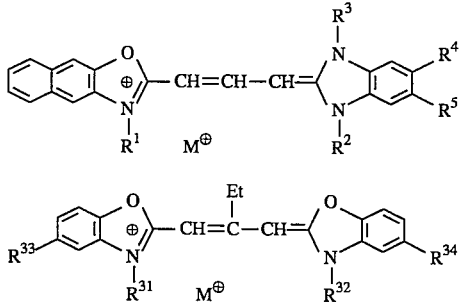
in which
R¹ and R² denote sulfoalkyl;
R³ denotes alkyl;
R⁴ denotes H, F, Cl, —CN, alkoxycarbonyl or carbamoyl;
R⁵ denotes —CN;
M⊕ denotes a counter ion (cation) which is optionally necessary to balance the charge;
R³¹ and R³² denotes sulfoalkyl;
R³³ and R³⁴ denote Cl or phenyl.
* * * * *